United States Patent
Watanabe et al.

(10) Patent No.: US 12,360,993 B2
(45) Date of Patent: Jul. 15, 2025

(54) METHOD AND DATABASE SYSTEM FOR OPTIMIZING QUERY PROCESSING EXECUTION SCHEME

(71) Applicant: Kioxia Corporation, Tokyo (JP)

(72) Inventors: Daiki Watanabe, Kawasaki Kanagawa (JP); Takeshi Ishihara, Yokohama Kanagawa (JP); Kenji Shirakawa, Tokyo (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/592,093

(22) Filed: Feb. 29, 2024

(65) Prior Publication Data
US 2024/0311372 A1 Sep. 19, 2024

(30) Foreign Application Priority Data
Mar. 15, 2023 (JP) .................... 2023-041003

(51) Int. Cl.
G06F 7/00 (2006.01)
G06F 11/34 (2006.01)
G06F 16/2452 (2019.01)
G06F 16/2453 (2019.01)

(52) U.S. Cl.
CPC .... *G06F 16/24526* (2019.01); *G06F 11/3409* (2013.01); *G06F 16/24542* (2019.01)

(58) Field of Classification Search
CPC ......... G06F 16/24526; G06F 16/24542; G06F 11/3409
USPC ................................ 707/600–899
See application file for complete search history.

(56) References Cited

U.S. PATENT DOCUMENTS

| | | | |
|---|---|---|---|
| 10,296,524 B1 | 5/2019 | Tung et al. | |
| 10,346,551 B2 | 7/2019 | Mishra et al. | |
| 11,521,101 B2 | 12/2022 | Marcé et al. | |
| 2014/0280034 A1* | 9/2014 | Harris | G06F 16/951 707/718 |

OTHER PUBLICATIONS

Aguilar-Saborit, Josep, et al. "POLARIS: The Distributed SQL Engine in Azure Synapse" Proceedings of the VLDB Endowment, 2020, vol. 13, No. 12, 3204-3216. DOI: https://doi.org/10.14778/3415478.3415545.

* cited by examiner

*Primary Examiner* — Isaac M Woo
(74) *Attorney, Agent, or Firm* — Kim & Stewart LLP (57) ABSTRACT

A method for executing query processing includes, in response to a query from a host, generating a task graph indicating a plurality of task sequences, each of the task sequences capable f performing query processing corresponding to the query. The sequences includes a first sequence that outputs data in a first compression state to a one of output targets, and a second sequence of tasks that outputs the data in a second compression state different from the first compression state to the one of the output targets. The method further includes determining a processing cost for each of the task sequences, selecting one of the task sequences in accordance with the determined processing cost, and performing the query processing corresponding to the query in accordance with the selected task sequence.

20 Claims, 10 Drawing Sheets

METHOD AND DATABASE SYSTEM FOR OPTIMIZING QUERY PROCESSING EXECUTION SCHEME

CROSS-REFERENCE TO RELATED APPLICATION (S)

This application is based upon and claims the benefit of priority from Japanese Patent Application No. 2023-041003, filed Mar. 15, 2023, the entire contents of which are incorporated herein by reference.

FIELD

Embodiments described herein relate generally to a method and a database system for optimizing a query processing execution scheme for a database.

BACKGROUND

In recent years, a memory system including a nonvolatile memory has become widespread. A memory system using a solid state drive (SSD) is used as an information processing device and a storage in a database system.

The database system executes processing in response to a query (more generally, a processing request). For example, SQL query processing is performed in a relational database. In the SQL query processing, it is desirable to be able to flexibly change a location (and/or timing) at which compression processing and expansion processing of data are executed and a device which stores compressed data.

DETAILED DESCRIPTION

Embodiments provide a new optimization method for query processing in a database system.

In general, according to an embodiment, a method for executing query processing on a database is provided. The method includes, in response to a query from a host, generating a task graph indicating a plurality of task sequences, each of the task sequences capable 41 performing query processing corresponding to the query. The plurality of task sequences includes a first sequence of tasks that outputs data in a first compression state to a one of output targets, and a second sequence of tasks that outputs the data in a second compression state different from the first compression state to the one of the output targets. The method further includes determining a processing cost for each of the plurality of task sequences, selecting one of the plurality of task sequences in accordance with the determined processing cost, and performing the query processing corresponding to the query in accordance with the selected one of the task sequences.

In general, according to another embodiment, a database system includes a plurality of servers including a first server and a second server, and a manager system. The manager system is configured to, in response to a query from a host, generate a task graph indicating a plurality of task sequences, each of the task sequences capable of performing query processing corresponding to the query. The plurality of task sequences includes a first sequence of tasks that outputs data in a first compression state to a one of output targets, and a second sequence of tasks that outputs the data in a second compression state different from the first compression state to the one of the output targets. The manager system is further configured to determine a processing cost for each of the plurality of task sequences, select one of the plurality of task sequences in accordance with the determined processing cost, and perform the query processing corresponding to the query in accordance with the selected one of the task sequences.

Hereinafter, a database system according to an embodiment will be described in detail with reference to the drawings. In the following description, components having substantially the same functions and configurations are denoted by the same reference symbols, and repeated description may be omitted. Each embodiment to be described below illustrates a device and method for embodying the technical idea of the embodiment. The technical idea of the embodiment does not limit the material, shape, structure, disposition, and the like of a component to those described below. As the technical idea of the embodiment, various modifications may be made to the scope of the claims.

In the following description, a "task graph" refers to a data set storing information on a cost required to process each task when a plurality of tasks with order relationships exist and at the same time expressing a directed graph by connecting front and rear relationships (leading and trailing relationships) of the plurality of corresponding tasks with arrows. The fact that a plurality of tasks have order relationships means that, for example, when tasks A, B and C exist in a task graph, the task C cannot be executed until the tasks A and B are completed. The tasks with the extension order may be referred to as a sequence of tasks.

A unit block which indicates the processing content of each task is called a "node". That is, a plurality of nodes which correspond to a plurality of tasks, respectively, are defined in a task graph. In other words, task and node have a one-to-one relationship. At each node, costs such as a time, power and a server usage fee required to process a task are collectively referred to as a "processing cost". Between nodes, an arrow which indicates the front and rear relationship between tasks is called an "edge". Namely, an edge indicates the input and output of respective nodes.

A "database" means a set of structured data including a relational database (RDB) and another database (NoSQL). The "relational database" is a database which is configured so that a plurality of data in a table format can be used in association with each other. An operation instruction for the relational database is written in a database language. For example, structured query language (SQL) is used as the corresponding database language. The database is operated by the SQL, and addition, erasure, and search (retrieval) of data stored in the database are executed. Furthermore, "NOSQL" refers to various databases other than relational databases, for example, such as key-value type databases which store a set of values for keys. Such NoSQL can be operated using a native language (often similar to but different from SQL) such as COL of Apache Cassandra. In the following description, a group of operations that a user wants to perform on a database and are defined using SQL or the like is simply referred to as a "query", and processing executed according to the query is referred to as "query processing". That is, query processing includes a plurality of tasks.

A "compression state" includes information indicating whether data to be input or output is in a compressed state or an uncompressed state. Further, when data is in a compressed state, the compression state includes information indicating by what method the corresponding data is compressed. Specifically, the compression state indicates information such as whether the data is compressed by lexicographic compression or byte compression (e.g., "gzip"). In other words, the compression state may be one compression state selected among a plurality of compression states compressed using different compression methods.

A "physical property" or a "property" indicates, when processing for a certain task (task processing) is executed, where a processing result is stored and what compression state it is. Namely, the physical property is given to a processing result obtained by a task included in a task graph. For example, when a relational database is configured with a plurality of information processing terminals (e.g., a plurality of servers) and each of the plurality of servers includes a plurality of storage devices (e.g., an SSD (solid state drive), a DRAM (dynamic random access memory) and a CPU (central processing unit)), the physical property includes information specifying a server and a storage device in which a result of corresponding task processing is stored. In the present embodiment, the physical property includes, in addition to the above-described information, information indicating the compression state of data stored as a result of task processing. As aforementioned, the "physical property" is expressed in a type that includes the concept of a data format.

1. First Embodiment

A database system according to a first embodiment will be described. A database system 10 according to the first embodiment is, for example, a relational database. The database system 10 communicates with a host 20, receives a command including a query from the host 20, and implements a function of the relational database according to the query.

1-1. Overall Configuration of Database System

Figure 1:
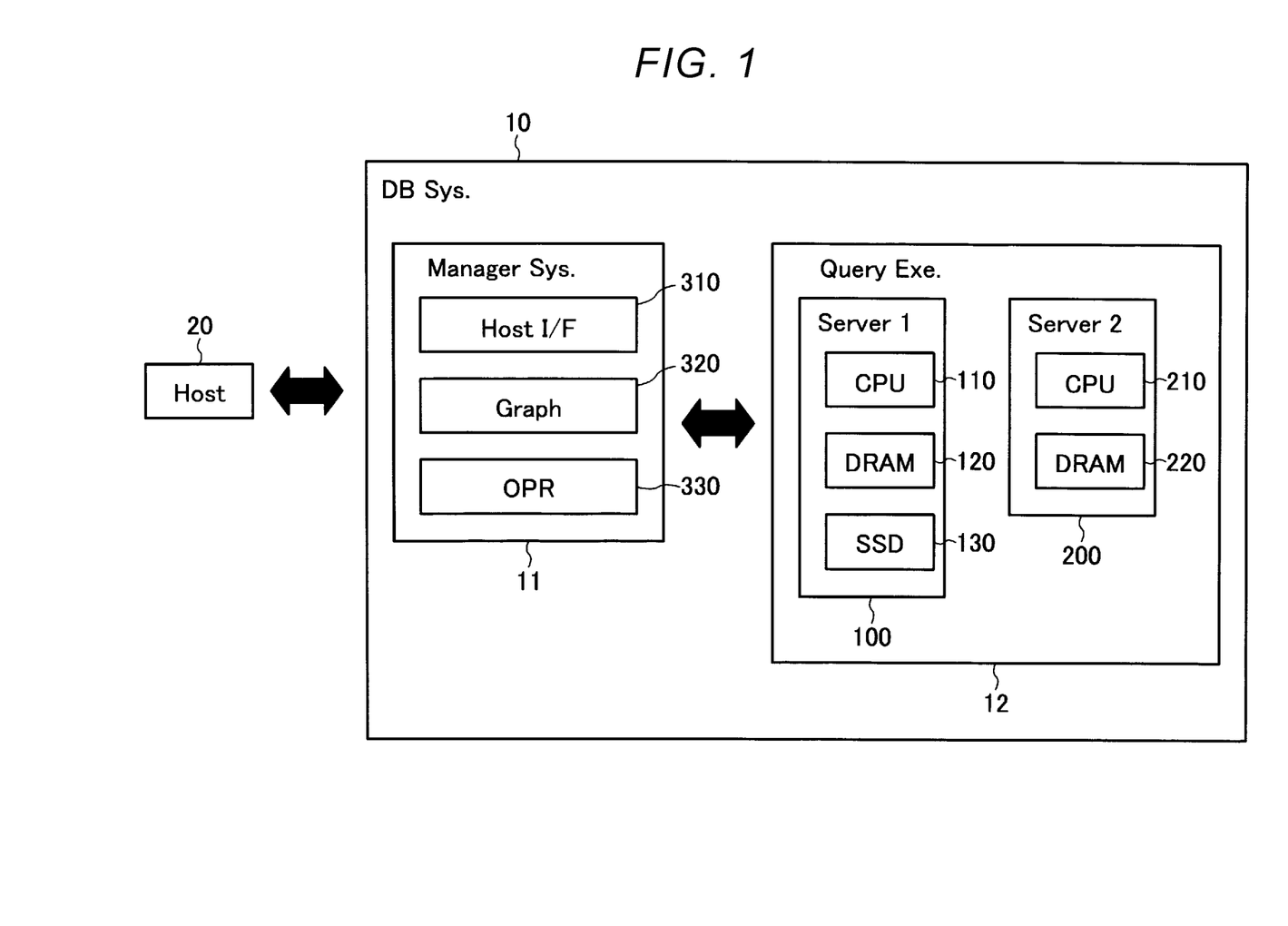
FIG. 1 is a block diagram illustrating a configuration of a database system according to an embodiment.

FIG. 1 is a block diagram illustrating a configuration of a database system according to an embodiment. As shown in FIG. 1, the database system 10 (DB Sys.) includes a management system 11 (Manager Sys.) and a query execution unit 12 (Query Exe.).

The management system 11 includes a host interface 310 (Host I/F), a task graph generation unit 320 (Graph) and an execution plan determination unit 330 (OPR). The management system 11 controls, by causing these functional units to cooperate, the query execution unit 12 using a task graph (a directed acyclic graph) to be described below. Each functional unit of the host interface 310, the task graph generation unit 320 and the execution plan determination unit 330 may be implemented by hardware, software, or a combination thereof. Further, it is not essential that the processing contents of the respective functional units be clearly distinguished as the host interface 310, the task graph generation unit 320, and the execution plan determination unit 330. Partial processing of certain processing may be executed by another functional unit, and each functional unit may be divided into smaller elements.

The host interface 310 executes processing according to the interface standard between the host 20 and the host interface 310. The host interface 310 transmits a command or the like received from the host 20 to the task graph generation unit 320 and the execution plan determination unit 330 via an internal bus. The host interface 310 transmits to the host 20, for example, a result of an operation executed according to a query.

The task graph generation unit 320 generates a task graph based on the query received from the host 20. For example, the task graph generation unit 320 analyzes the corresponding query, specifies a plurality of tasks included in the query, and generates and transforms a task graph based on the order relationships of the plurality of corresponding tasks. A task graph generation method and a task graph transformation method will be described below in detail.

Based on the task graph generated by the task graph generation unit 320 and the processing cost of each task, the execution plan determination unit 330 determines an execution path (may be referred to as a sequence of tasks) in which query processing on the task graph is efficiently executed. That is, the execution plan determination unit 330 generates an execution plan of query processing by determining one execution path among plurality of execution paths, and drives the query execution unit 12 based on the corresponding execution plan. It can be said that the above processing is processing of optimizing a query processing execution scheme for a database using a task graph. A method of calculating a processing cost and a method of optimizing a query processing execution scheme will be described below in detail.

The above optimization may mean selecting a processing path with a lowest processing cost (for example, a shortest processing time derived from calculation of a processing cost) from among the plurality of processing paths on the task graph. However, the processing path with the lowest processing cost does not necessarily have to be selected. For example, a processing path may be selected in consideration of circumstances other than the processing cost. In detail, a path other than the processing path with the lowest processing cost may be selected depending on the convenience of the database system 10, the host 20 or a user requesting query processing.

The query execution unit 12 includes a first server 100 (Server 1) and a second server 200 (Server 2). By causing the first server 100 and the second server 200 to cooperate, the query execution unit 12 implements an operation (e.g., query processing) in response to the query received from the host 20.

The first server 100 is a storage server primarily used for storing data. The first server 100 includes a CPU 110, a DRAM 120 and an SSD 130. The CPU 110 includes, for example, a cache memory such as an SRAM (static random access memory). In the following description, data being stored in the SRAM of the CPU 110 will be expressed as that data is stored in the CPU 110. Namely, the first server 100 can store data in the CPU 110, the DRAM 120, and the SSD 130.

The second server 200 is a server primarily used for arithmetic processing. The second server 200 has a CPU 210 and a DRAM 220. Since the second server 200 is a server with high arithmetic processing capacity, the second server 200 does not need to include a storage such as an SSD. Like the CPU 110, the CPU 210 also includes, for example, a cache memory such as an SRAM. In the following description, data being stored in a register or the SRAM of the CPU 210 will be expressed as that data is stored in the CPU 210. Namely, the second server 200 can store data in the CPU 210 and the DRAM 220. The CPU 210 can execute arithmetic processing at a higher speed than the CPU 110. The capacity of the DRAM 220 is larger than the capacity of the DRAM 120. The second server 200 may include an SSD.

1-2. Transformation of Task Graph

Figure 2:
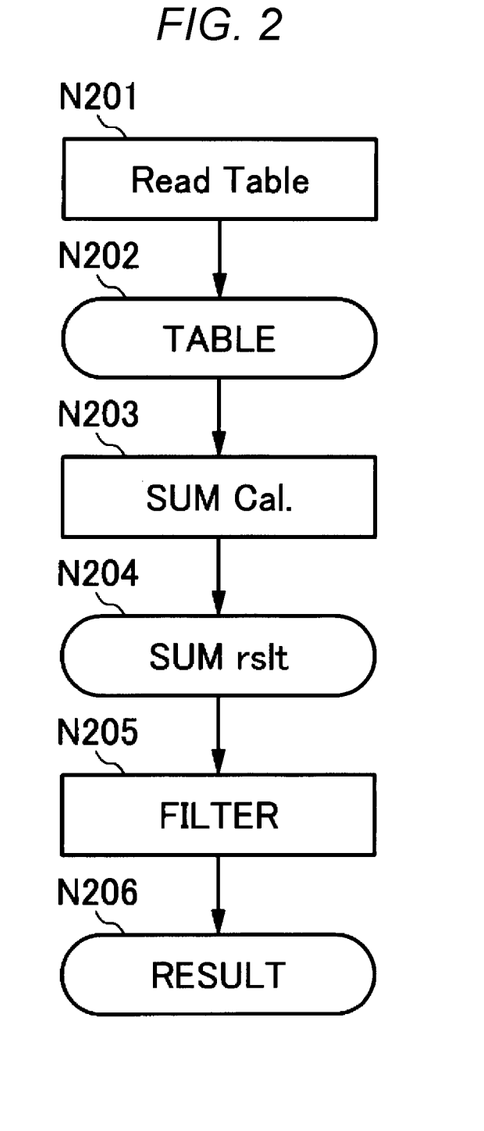
FIG. 2 is a diagram illustrating a task graph according to an embodiment.
Figure 3:
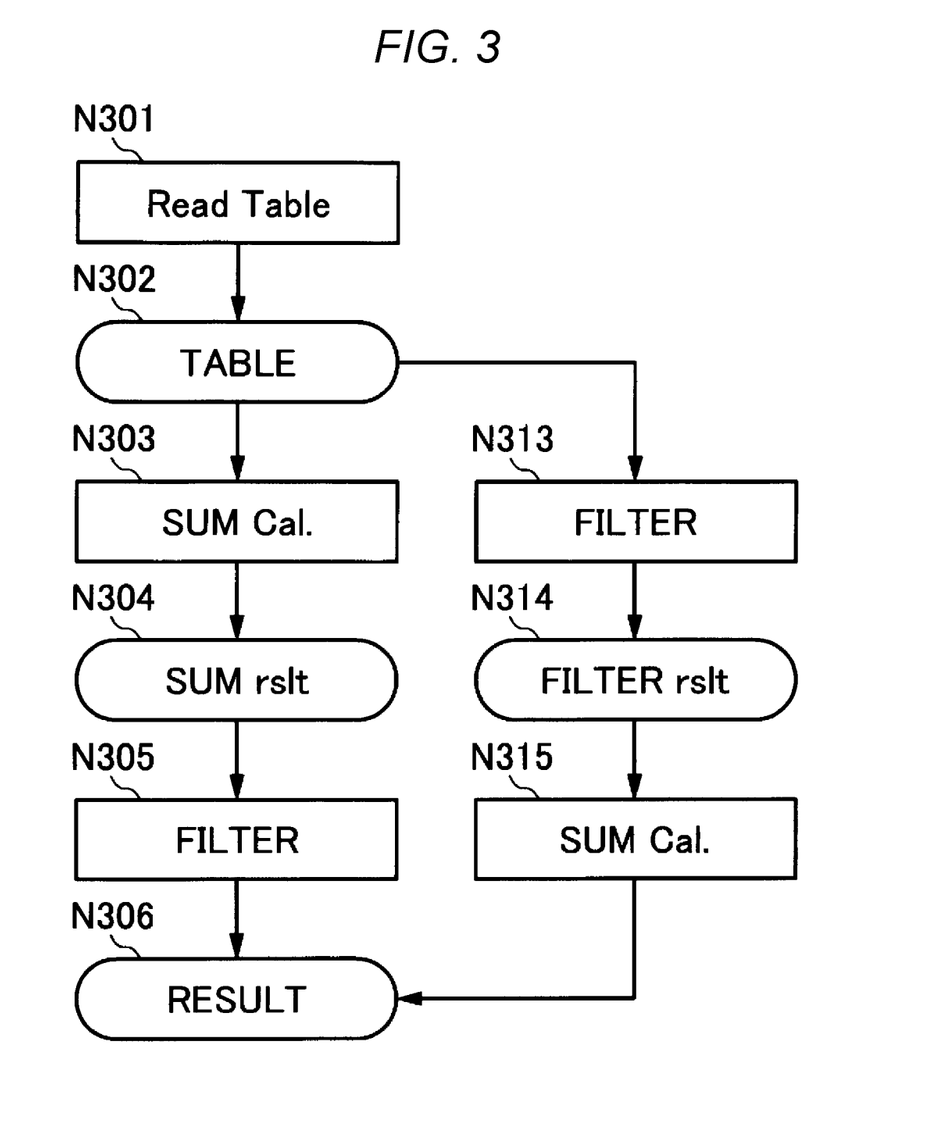
FIG. 3 is a diagram illustrating a task graph according to an embodiment.
Figure 4:
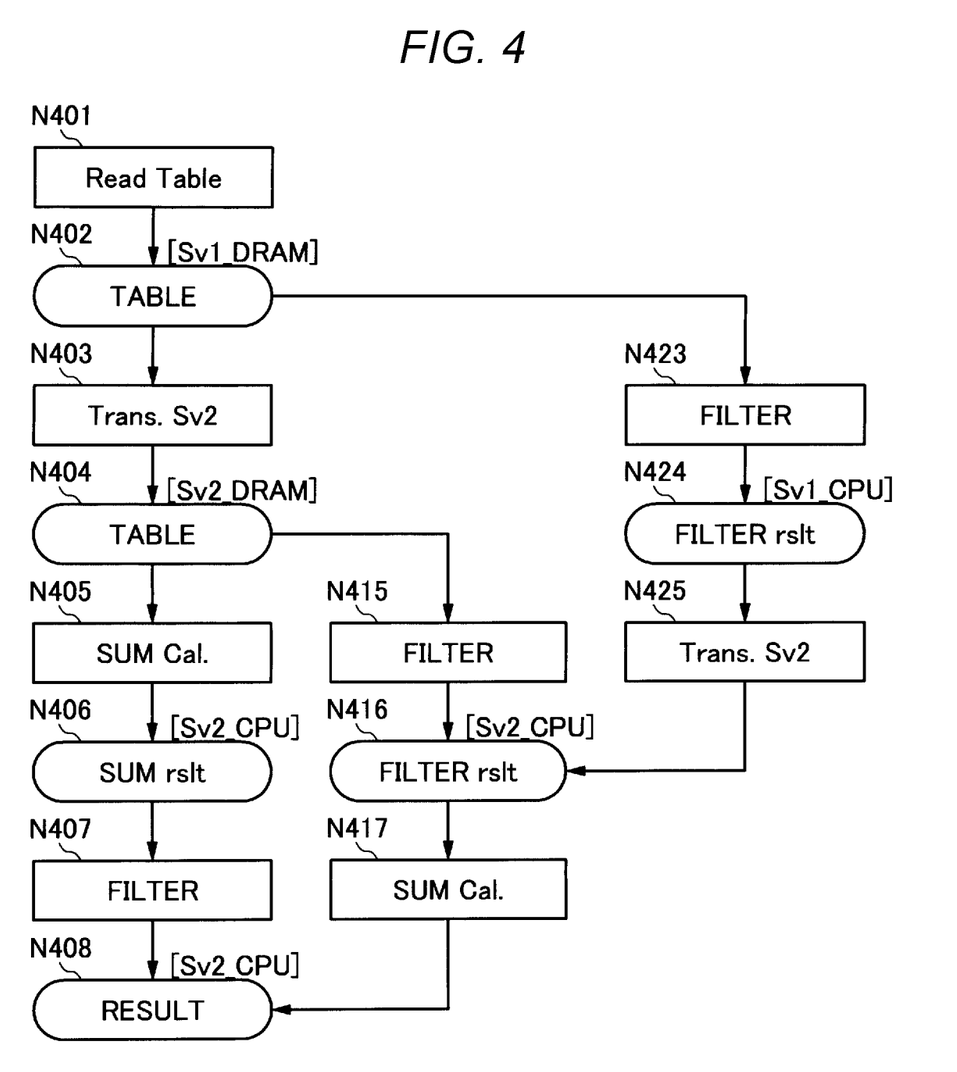
FIG. 4 is a diagram illustrating a task graph according to an embodiment.

Generation and transformation of a task graph will be described with reference to FIGS. 2 to 4. FIGS. 2 to 4 are diagrams illustrating task graphs according to one or more embodiments. A process in which the task graph generation unit 320 generates a task graph based on the query received from the host 20 will be described using FIGS. 2 to 4.

In this example, as query processing, processing of calculating a sum for each ID with respect to data recorded in a table and filtering a specific ID with respect to a result of the calculation is illustrated. For example, a query in this case is "SELECT ID, SUM (VALUE) FROM TABLE Group by ID HAVING ID<100".

FIG. 2 shows a default processing order before executing task graph transformation. When the database system 10 receives the above query from the host 20, first, the task graph shown in FIG. 2 is generated. In FIG. 2, processing described in the query is executed in the described order by one predetermined device (server). In FIG. 2, a case where each processing is executed on the first server 100 will be described.

In the task graph shown in FIG. 2, first, a read operation for a table stored in the SSD 130 of the first server 100 is executed (N201: Read Table). Read data is stored in the DRAM 120 of the first server 100 as a result of the read operation (N202: TABLE). The corresponding data is transferred to the CPU 110 from the DRAM 120.

The CPU 110 executes SUM calculation for each ID on the transferred data (N203: SUM Cal.). A calculated result is stored in the CPU 110 as a calculation result of N203 (N204: SUM rslt). Then, as the CPU 110 performs filtering processing on this calculation result for a specific ID (for example, an ID for which a SUM calculation result is less than 100) (N205: FILTER), a final result is derived (N206: RESULT). In this case, the final result is stored in the CPU 110.

In FIG. 2, each of the blocks N201 to N206 is called a node. Among a plurality of nodes, a node indicated by a rectangular block is called an AND node, and a node indicated by a substantially elliptical block is called an OR node. Arrows that connect respective blocks are edges.

The AND node represents a task when the database system 10 executes query processing. For example, the AND node includes data sum calculation processing (SUM), data joining processing (JOIN), and data filtering processing (FILTER). In the case of FIGS. 2, N201, N203 and N205 are AND nodes. In FIG. 2, a configuration in which one piece of data is input to each AND node is simply illustrated, but information related to a processing condition is input to each AND node separately from data.

The OR node represents a grouping of AND nodes which perform logically equivalent output. That is, the OR node represents a result obtained by logically equivalent processing. Details of the OR node will be described below. In the case of FIGS. 2, N202, N204 and N206 are OR nodes.

FIG. 3 shows a task graph when logical transformation is executed on a default task graph. Logical transformation means transformation of a task graph by applying a transformation rule regarding change or the like in the execution order of tasks. In this case, a plurality of paths are derived, in which the processing order of each AND node is changed so that a logically equivalent final result is obtained.

As shown in FIG. 3, since the order of a table read operation cannot be changed, in the same manner as N201 and N202 of FIG. 2, a table read operation (N301: Read Table) and storage of read data (N302: TABLE) are executed in this order. Meanwhile, since it is possible to change the orders of SUM calculation and filtering processing, an output from N302 branches.

Since N303 to N306 are the same as N203 to N206 of FIG. 2, description thereof will be omitted. In FIG. 3, paths of N313 to N315 are provided in parallel to the paths of N303 to N305. Even in any path, data stored in the DRAM 120 at N302 is transferred to the CPU 110 from the DRAM 120.

In the path of N313 to N315, first, the CPU 110 executes filtering processing for a specific ID on the corresponding data (N313: FILTER). The filtered data is stored in the CPU 110 as a result of the filtering processing (N314: FILTER rslt). The CPU 110 executes SUM calculation for each ID with respect to a result of the filtering processing (N315: SUM Cal.). By the above processing, a final result is derived (N306).

Since processing of tasks for both SUM calculation and filtering processing is executed regardless of the path of N303 to N305 and the path of N313 to N315, N306 (an OR node) corresponds to a result obtained by logically equivalent processing. Although these paths are logically equivalent, the processing speed and the processing amount of the CPU may differ depending on the processing order of the tasks. Therefore, by calculating processing costs for these paths and selecting a path with a smaller processing cost, it is possible to optimize a query processing execution scheme.

FIG. 4 shows a task graph when physical transformation is executed on a task graph to which logical transformation is applied. The physical transformation means transformation of a task graph by applying a transformation rule regarding in which information processing device task processing is executed, in which storage device data obtained as a result of task processing is stored, and the like. In physical transformation, a "physical property" representing information on an information processing device which executes task processing and a storage device which stores a result of task processing is given to a node, and a task graph is further expanded according to the corresponding physical property. Even in this case, a plurality of paths are derived, in which the processing order of each AND node is changed so that a logically equivalent final result is obtained. Paths when physical transformation is executed on both the paths in the task graph shown in FIG. 3 are various. Thus, FIG. 4 illustrates a case where the path of N313 to N315 in the task graph shown in FIG. 3 and a final result are stored in the second server 200.

As described above, a "physical property" is information which defines how the output data of an AND node is physically stored and indicates the attribute of the corresponding data. In the case of FIG. 4, a plurality of paths are derived in consideration of a case where each task processing is executed in the first server 100 or the second server 200.

FIG. 4 illustrates a configuration in which a physical property includes only a server and a storage device in which data is stored. However, as will be described below, a physical property in a task graph on which all transformations according to the present embodiment are reflected includes, in addition to the above items, information on a compression state of data.

As shown in FIG. 4, since the order of a table read operation cannot be changed, in the same manner as N201 and N202 of FIGS. 2 and N301 and N302 of 3, a table read operation (N401: Read Table) and storage of read data (N402: TABLE) are executed in this order. In FIG. 4, a physical property indicated in parentheses is given above a target node. As shown in FIG. 4, for example, at N402, data is stored in the DRAM 120 of the first server 100.

Since data stored in the DRAM 120 may be processed by the first server 100 or may be processed by the second server 200, the output from N402 branches.

First, a case where a task is processed by the second server 200 will be described. Data stored in the DRAM 120 is transferred to the second server 200 (N403: Trans. Sv2). The transferred data is stored in the DRAM 220 of the second server 200 as a result of the transfer processing (N404: TABLE). The corresponding data is transferred from the DRAM 220 to the CPU 210.

Since the path of N405 to N408 in FIG. 4 is the same as the path of N303 to N306 shown in FIG. 3, description thereof will be omitted. In the same manner, since the path of N415 to N417 in FIG. 4 is the same as the path of N313 to N315 shown in FIG. 3, description thereof will be omitted. Both a SUM calculation result at N406 and a result of filtering processing at N416 are stored in the CPU 210 of the second server 200.

Next, a case where a task is processed by the first server 100 will be described. In this case, data stored in the DRAM 120 is transferred to CPU 110. The CPU 110 executes filtering processing for a specific ID on the corresponding data (N423: FILTER). The filtered data is stored in the CPU 110 as a result of the filtering processing (N424: FILTER rslt).

The data stored in the CPU 110 is transferred to the second server 200 (N425: Trans. Sv2). The transferred data is stored in the CPU 210 of the second server 200 as a result of transfer processing (N416). In the data transfer, although it was described with reference to FIG. 4 that data is directly transferred from the CPU 110 of the first server 100 to the CPU 210 of the second server 200, the data may be transferred from the CPU 110 to the CPU 210 via the DRAM 120 of the first server 100 and the DRAM 220 of the second server 200. Alternatively, the destination of the data transfer may be the DRAM 220.

In both a path in which the output branched from N402 passes through N403, N404, N415, and N416 and a path in which the output branched from N402 passes through N423, N424, N425, and N416, since the task of filtering processing is executed before the SUM calculation, N416 (an OR node) is a result obtained by logically equivalent processing.

Although the above-described paths are logically equivalent, the processing speed and processing amount of a CPU may differ depending on a task processing order and a server in which the task processing is executed. Therefore, by calculating processing costs for these paths and selecting a path with a smaller processing cost, it is possible to optimize a query processing execution scheme.

[1-3. Calculation of Processing Cost]

Figure 5:
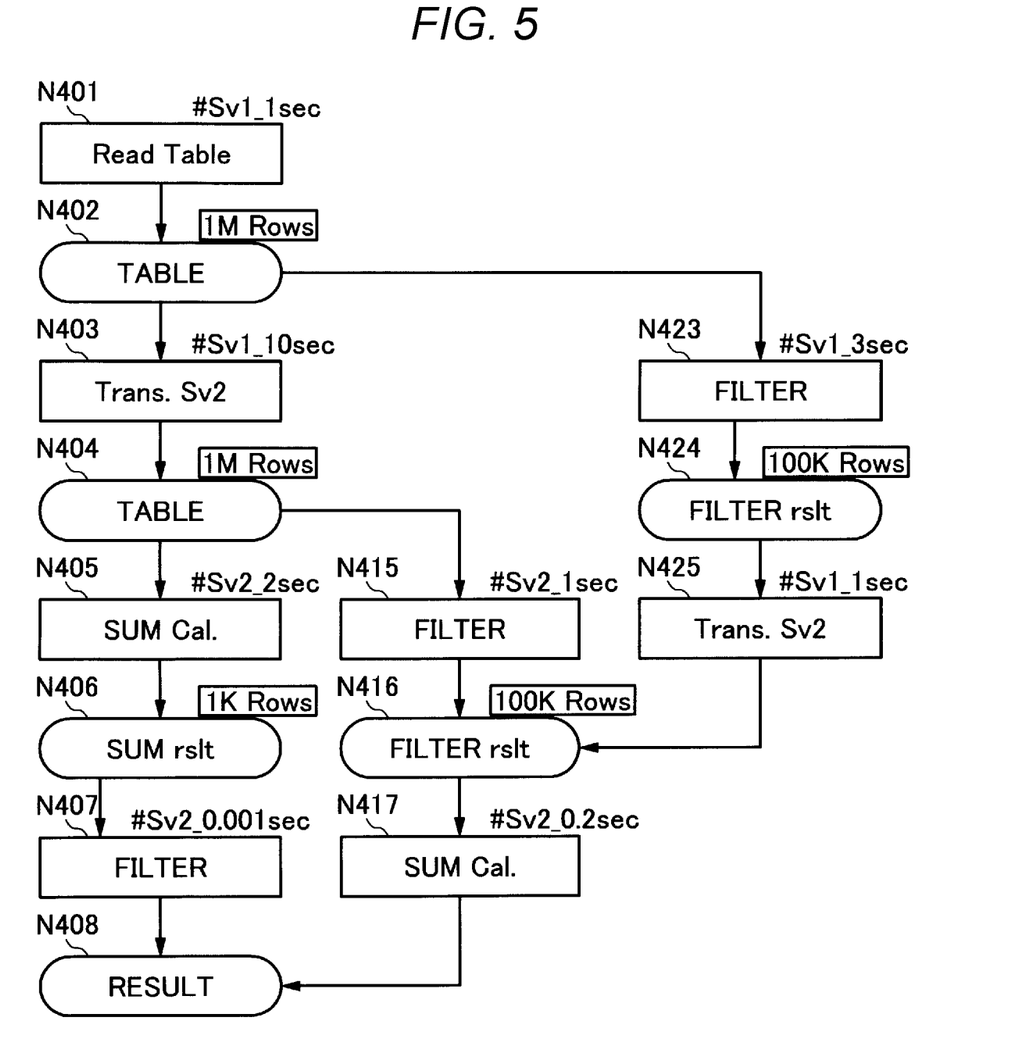
FIG. 5 is a diagram illustrating a method for calculating a processing cost according to an embodiment.

An example of a method of calculating a processing cost will be described with reference to FIG. 5. The nodes described in the task graph shown in FIG. 5 are the same as the nodes described in the task graph shown in FIG. 4. Calculation of a processing cost shown in FIG. 5 is performed by calculating a processing time corresponding to corresponding task processing for each of the plurality of nodes. Specifically, FIG. 5 shows an example in which a processing cost is calculated in a method of multiplying the number of rows on which task processing is executed among rows included in a table being a read target, by a processing time per row. In FIG. 5, the character "# . . . " given above each AND node indicates a server in which task processing corresponding to each AND node is executed and a time required for the corresponding task processing. A character given above each OR node and enclosed in a rectangular frame indicates the number of rows of data obtained as a result of executing task processing.

In the following description, it will be described that in the first server 100, a time required to read data of one row is 1 usec, a time required to execute filtering of data of one row is 3 usec and a time required to execute SUM calculation for data of one row is 6 μsec. Meanwhile, it will be described that in the second server 200, a time required to execute filtering of data of one row 1 μsec and a time required to execute SUM calculation for data of one row is 2 μsec. It will be described that a time required to transfer data of one row from the first server 100 to the second server 200 is 10 μsec.

When data of 1 million rows is included in a table stored in the SSD 130 of the first server 100, as a processing cost for a table read operation at N401, a processing cost of 1 sec is calculated by multiplying 1 million rows by 1 μsec. In other words, at N401, a processing cost of "1 sec in the first server 100" is calculated (#SV1_1 sec). As a result of the above read operation, at N402, a table includes data of 1 million rows (1M Rows).

By the same calculation method as described above, a result of calculating a processing cost for each node is shown in FIG. 5. At N403, a processing cost of "10 seconds in the first server 100" is calculated (#SV1_10 sec). At N405, a processing cost of "2 seconds in the second server 200" is calculated (#SV2_2 sec). At N407, a processing cost of "0.001 sec in the second server 200" is calculated (#SV2_0.001 sec). At N415, a processing cost of "1 sec in the second server 200" is calculated (#SV2_1 sec). At N417, a processing cost of "0.2 sec in the second server 200" is calculated (#SV2_0.2 sec). At N423, a processing cost of "3 sec in the first server 100" is calculated (#SV1_3 sec). At N425, a processing cost of "1 sec in the first server 100" is calculated (#SV1_1 sec). As filtering processing (N415 and N423) is executed, the number of rows included in the table decreases from 1 million rows to 100,000 rows. As SUM calculation processing is executed, the number of rows included in the table decreases from 1 million rows to 1,000 rows.

In FIG. 5, the sum of processing costs in the left path (the path passing through N405 to N407) is 13.0001 seconds. The sum of processing costs in the middle path (the path passing through N415 to N417) is 12.2 seconds. The sum of processing costs in the right path (the path passing through N423 to N425, N416 and N417) is 5.2 seconds. As described above, a processing cost for each path can be calculated. In the example of FIG. 5, the right path with a smallest sum of processing costs can be determined as an optimal query processing execution scheme.

In the task graph shown in FIG. 5, a compression state of data is not taken into consideration. However, as will be described below, when a task graph includes a path depending on a compression state of data, a processing cost at each node is calculated based on the compression state.

Although FIG. 5 shows an example in which a processing cost is calculated by simply multiplying the number of rows on which task processing is executed, by a processing time per row, a method for calculating a processing cost is not limited to this method. For example, instead of or in addition to the above condition, a processing cost may be calculated by taking into consideration constraints in memory usage amount. Furthermore, a processing cost may be calculated by taking into consideration not only a processing time as described above but also at the same time the power consumption of a device involved in processing, the usage fee of a server and the like.

Figure 6:
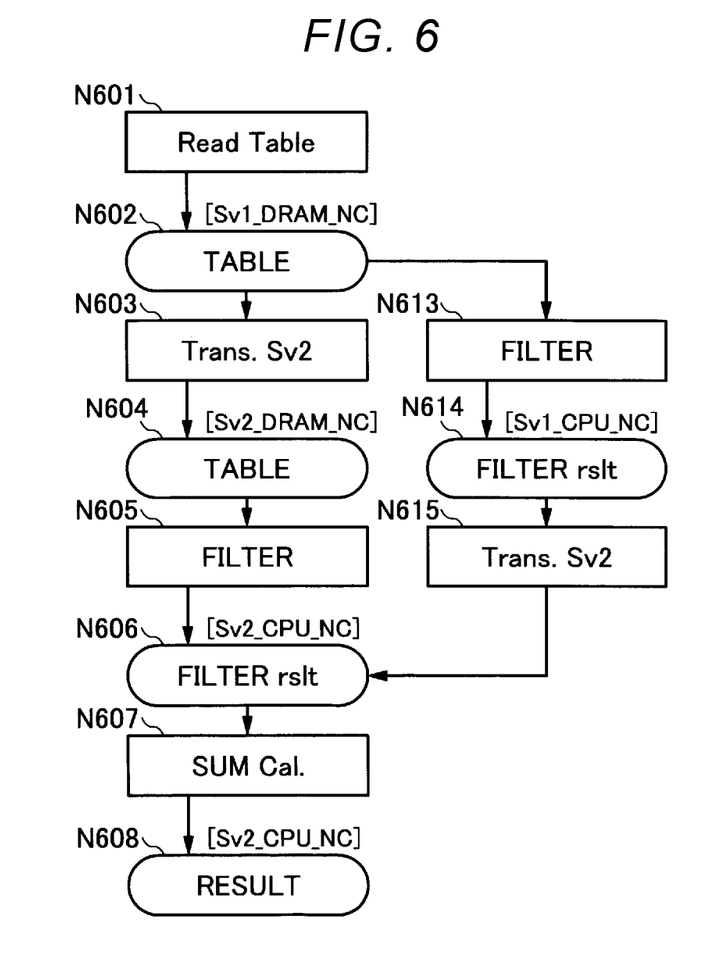
FIG. 6 is a diagram illustrating a task graph according to an embodiment.

1-4. Transformation of Task Graph by Taking Compression State into Consideration Transformation of a task graph by taking a compression state into consideration will be described with reference to FIGS. 6 and 7. The task graph shown in FIG. 6 is a task graph before corresponding transformation, and includes only the path passing through N415 to N417 and the path passing through N423 to N425 among the paths shown in FIG. 4. The task graph shown in FIG. 7 is a task graph after applying the above transformation.

N601 to N604 of FIG. 6 correspond to N401 to N404, respectively, of FIG. 4. N605 to N607 of FIG. 6 correspond to N415 to N417, respectively, of FIG. 4. N608 of FIG. 6 corresponds to N408 of FIG. 4. N613 to N615 of FIG. 6 correspond to N423 to N425, respectively, of FIG. 4. As mentioned above, each node of FIG. 6 is the same as each node of FIG. 4. Meanwhile, a physical property given to each OR node in FIG. 6 is different from a physical property shown in FIG. 4 in that the former includes information on the compression state of data in addition to information on a server and a storage device in which the data is stored. In FIG. 6, "NC" written at the end of a physical property means that data is not compressed.

Figure 7:
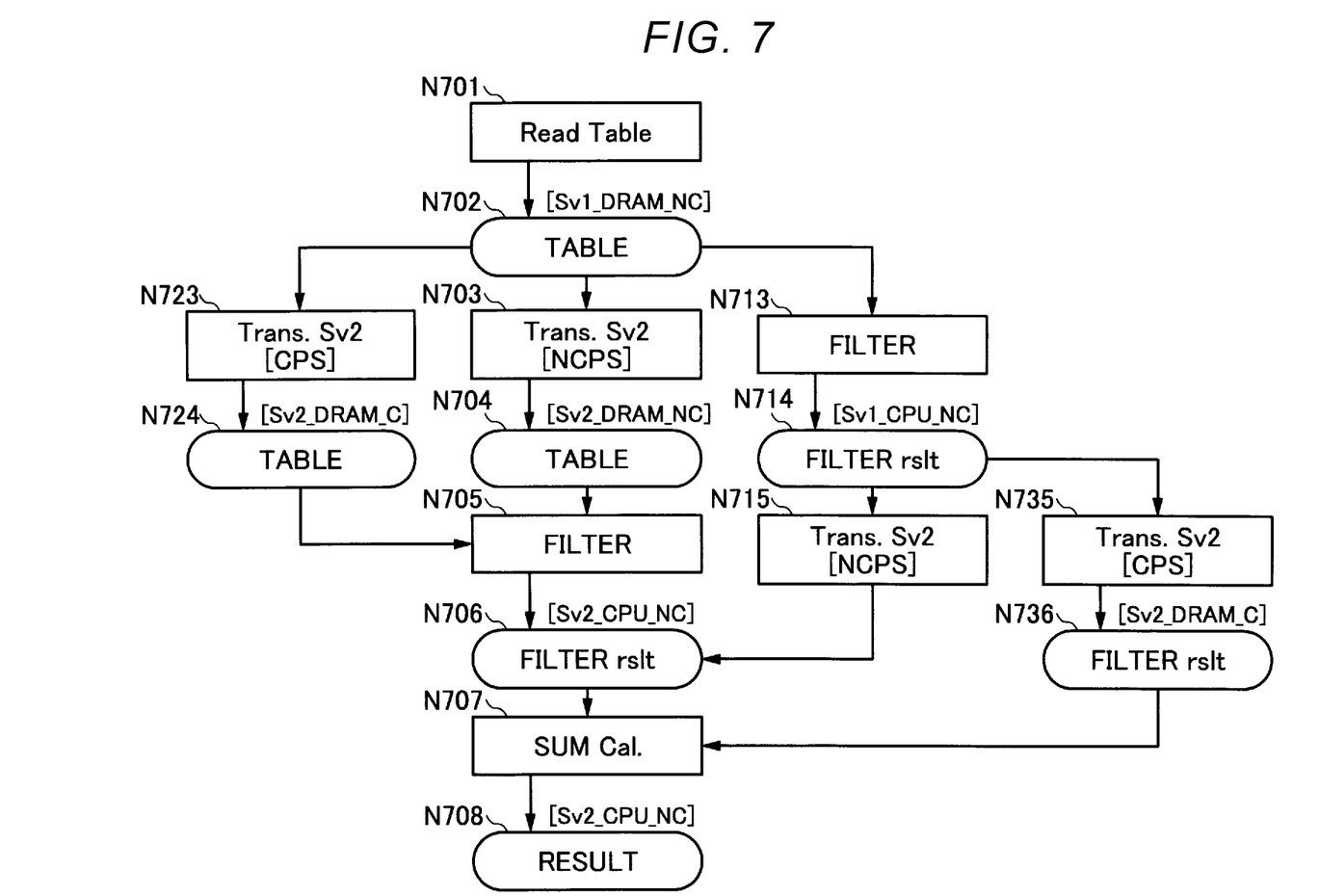
FIG. 7 is a diagram illustrating a task graph according to an embodiment.

FIG. 7 shows a task graph when transformation is executed for the task graph of FIG. 6 in consideration of a compression state. Transformation that takes a compression state into consideration includes transformation that corresponds to, when executing a data read or write operation, compression and expansion (i.e., decompression) of the corresponding data, and transformation that corresponds to, when executing transfer of data, compression and expansion (i.e., decompression) of the corresponding data. FIG. 7 shows an example to which the latter transformation is applied. Specifically, transformation that takes a compression state into consideration means transformation to which a transformation rule is applied in that information on the compression state of data is added to a physical property so that, when transferring data from the first server 100 to the second server 200, uncompressed data may be transferred. N701 to N708 of FIG. 7 correspond to N601 to N608, respectively, of FIG. 6. N713 to N715 of FIG. 7 correspond to N613 to N615, respectively, of FIG. 6. "Trans. SV2 [NCPS]" in N703 and N715 means that uncompressed data is transferred from the first server 100 to the second server 200.

In FIG. 7, as a result of the transformation taking into consideration a compression state as described above, an output from processing (N702 and N714) of transferring data from the first server 100 to the second server 200 branches. As shown in FIG. 7, in a path passing through N723 and N724, data stored in the DRAM 120 is compressed and transferred to the second server 200 (N723: Trans. SV2 [CPS]). The transferred data is stored in a compressed state in the DRAM 220 of the second server 200, as a result of transfer processing (N724: TABLE). Data which is compressed is referred to as compressed data, and data which is not compressed (or data which is uncompressed) is referred to as uncompressed data.

In the above case, calculation of processing costs at N703 and N704 and processing costs at N723 and N724 is performed based on the compression states of input data or output data for these nodes. Specifically, when transferring data from the DRAM 120 of the first server 100 to the DRAM 220 of the second server 200, calculation of a processing cost is performed based on whether output data from the DRAM 120 or input data to the DRAM 220 is uncompressed or compressed.

Compressed data stored in the DRAM 220 at N724 is transferred to the CPU 210, and filtering processing is executed in the CPU 210 (N705: FILTER). In order to execute the filtering processing of N705, the above compressed data is expanded into uncompressed data. Therefore, when calculating a processing cost, the edge extending from N724 to N705 includes a processing cost regarding expansion of compressed data. Expansion f the corresponding compressed data is executed by cooperation of the CPU 210 and the DRAM 220.

N703 may be referred to as a "first node" and N723 may be referred to as a "second node". Both the first node and the second node output logically the same data, that is, data the same as data read from TABLE. This data may be referred to as "target data". Both the output of the first node and the output of the second node are transferred to the DRAM 220 of the second server 200. In this case, the DRAM 220, which is the target of these outputs, may be referred to as an "output target".

Data output from the first node is uncompressed data, and data output from the second node is compressed data. Namely, the data output from the first node and the second node are in different compression states. The compression state of the data output from the first node may be referred to as a "first compression state", and the compression state of the data output from the second node may be referred to as a "second compression state".

In the above case, it may be mentioned that the first node (N703) outputs the target data to the output target (the DRAM 220) in the first compression state (e.g., uncompressed state). In the same manner, it may be mentioned that the second node (N723) outputs the corresponding target data to the corresponding output target (the DRAM 220) in the second compression state (e.g., compressed state). As shown in FIG. 7, the task graph simultaneously includes the first node and the second node. The first compression state may correspond to a compressed state, and the second compression state may correspond to an uncompressed state. When both the first compression state and the second compression state indicate a state in which data is compressed, the first compression state and the second compression state may be compressed states of compressing using the same compression method, or may be compressed states of compressing using different compression methods. The above phrase "the task graph simultaneously includes the first node and the second node" means that the task graph is a task graph which is transformed according to a certain transformation rule, in a task graph which is transformed according to a plurality of transformation rules, and that the first node and the second node are included in a final task graph (a task graph when "Yes" is selected in S805 of FIG. 8 to be described below) after transformation ends.

With respect to a point where an output from N714 branches, as shown in FIG. 7, in a path passing through N735 and N736, data stored in the CPU 110 (a result of filtering processing) is compressed and is transferred to the second server 200 (N735: Trans. SV2 [CPS]). The corresponding transferred data is stored in a compressed state in the DRAM 220 of the second server 200 as a result of the transfer processing (N736: FILTER rslt).

Compressed data stored in the DRAM 220 at N736 is transferred to the CPU 210, and SUM calculation is executed in the CPU 210 (N707: SUM Cal.). In order to execute the calculation of N707, the above compressed data is expanded into uncompressed data. Therefore, when calculating a processing cost, the edge extending from N736 to N707 includes a processing cost regarding expansion of compressed data.

In the above example, when transferring data between servers, a configuration which generates a path for transferring compressed data and a path for transferring uncompressed data is illustrated. However, when storing data in a storage device, a path for storing compressed data and a path for storing uncompressed data may be generated.

As described above, by the task graph according to the present embodiment, when transferring data between servers, processing costs for a path which transfers compressed data and a path which transfers uncompressed data may be calculated.

In the above example, a configuration in which the second server 200 has the CPU 210 and the DRAM 220 is illustrated. Alternatively, the second server 200 can have FPGA (field-programmable gate array) instead of the CPU 210 and the DRAM 220. In this case, the second server 200 is implemented by executing the process of the CPU 210 and the DRAM 220 by FGPA.

1-5. Optimization of Query Processing Execution Scheme

Figure 8:
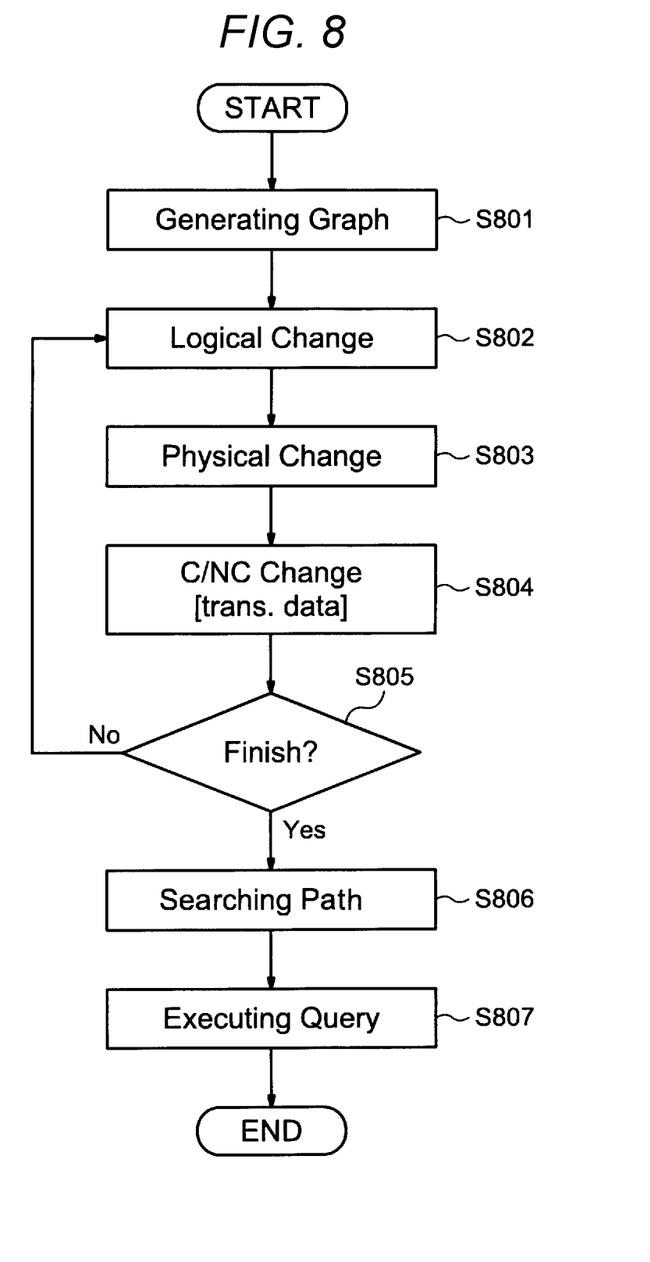
FIG. 8 is a flowchart for optimizing a query processing execution scheme in a database system according to an embodiment.

The operation of the database system 10 will be described with reference to FIG. 8. The corresponding operation is started as the host 20 issues a command to the database system 10. The database system 10 starts optimization of a query processing execution scheme by analyzing a query included in the command received from the host 20.

First, the database system 10 generates an initial task graph according to the content defined by the query (S801: Generating Graph). In the case of the present embodiment, a task graph as shown in FIG. 2 is generated according to a query of "SELECT ID, SUM (VALUE) FROM TABLE HAVING ID<100".

Next, the database system 10 transforms the task graph by applying a transformation rule (logical transformation) regarding change in the execution order of task processing (S802: Logical Change). By applying logical transformation, the database system 10 derives a plurality of paths in which the processing order of each AND node is changed, and generates a task graph as shown in FIG. 3.

Next, the database system 10 transforms the task graph by applying a transformation rule (physical transformation) regarding in which information processing device task processing is to be executed, in which storage device data obtained as a result of the task processing is to be stored, and the like (S803: Physical Change). By applying physical transformation, the database system 10 derives a plurality of paths in which the processing order of each AND node is changed, depending on a physical property given to each node and generates a task graph as shown in FIG. 4.

Next, when transferring data between servers or storage devices, the database system 10 transforms the task graph by applying a transformation rule regarding whether to execute compression and expansion of the corresponding data (S804: C/NC Change [trans. data]). By applying the above transformation, the database system 10 derives a plurality of paths branched according to a physical property given to each node, and generates a task graph as shown in FIG. 7.

When applying transformation of a task graph according to S804 above, the database system 10 identifies a physical property given to each node, and performs transformation of a task graph according to the corresponding physical property. As described above, the physical property includes information on the compression state of input data or output data of each node.

After applying the transformations of S802 to S804, the database system 10 performs determination of whether the transformations are finished (S805: Finish?). If all the transformations are finished ("Yes" of S805), the database system 10 executes a process related with next step S806. On the other hand, if all the transformations are not finished ("No" of S805), the database system 10 performs the transformations of S802 to S804 again.

In S806, the database system 10 searches for an optimal execution path among the plurality of paths in the task graph (S806: Searching Path). In detail, the database system 10 calculates processing costs for a plurality of nodes included in the task graph, and calculates the sum of processing costs for each of the plurality of paths, based on the processing costs for the respective nodes. For example, the database system 10 determines a path with the smallest sum of processing costs as an optimal execution path. Instead of or in addition to the above condition, a processing cost may be calculated by simultaneously considering costs such as constraints in memory usage amount, power consumption of a device involved in processing, the usage fee of a servers, and the like.

Next, the database system 10 executes query processing based on the execution path determined in S806 (S807: Executing Query). As the database system 10 transmits a result of executing the query processing to the host 20, the above flow ends.

As mentioned above, the "physical property" is expressed in a type that includes the concept of a data format. The type of the corresponding data format includes a column-oriented data compression format or a byte-oriented data compression format. The column-oriented data compression format is, for example, Apache Parquet or ORC. The byte-oriented data compression format is, for example, gzip or lz4.

As described above, by the database system 10 according to the present embodiment, when optimizing a query processing execution scheme for a database using a task graph, it is possible to perform the corresponding optimization by considering the possibility of both when data compression is performed and when data compression is not performed.

2. Second Embodiment

A database system according to a second embodiment will be described with reference to FIG. 9. Since the configuration of the database system according to the second embodiment is similar to that of the database system according to the first embodiment, description of common features will be omitted. Hereinafter, differences from the database system according to the first embodiment will be mainly described.

2-1. Transformation of Task Graph Considering Compression State

Figure 9:
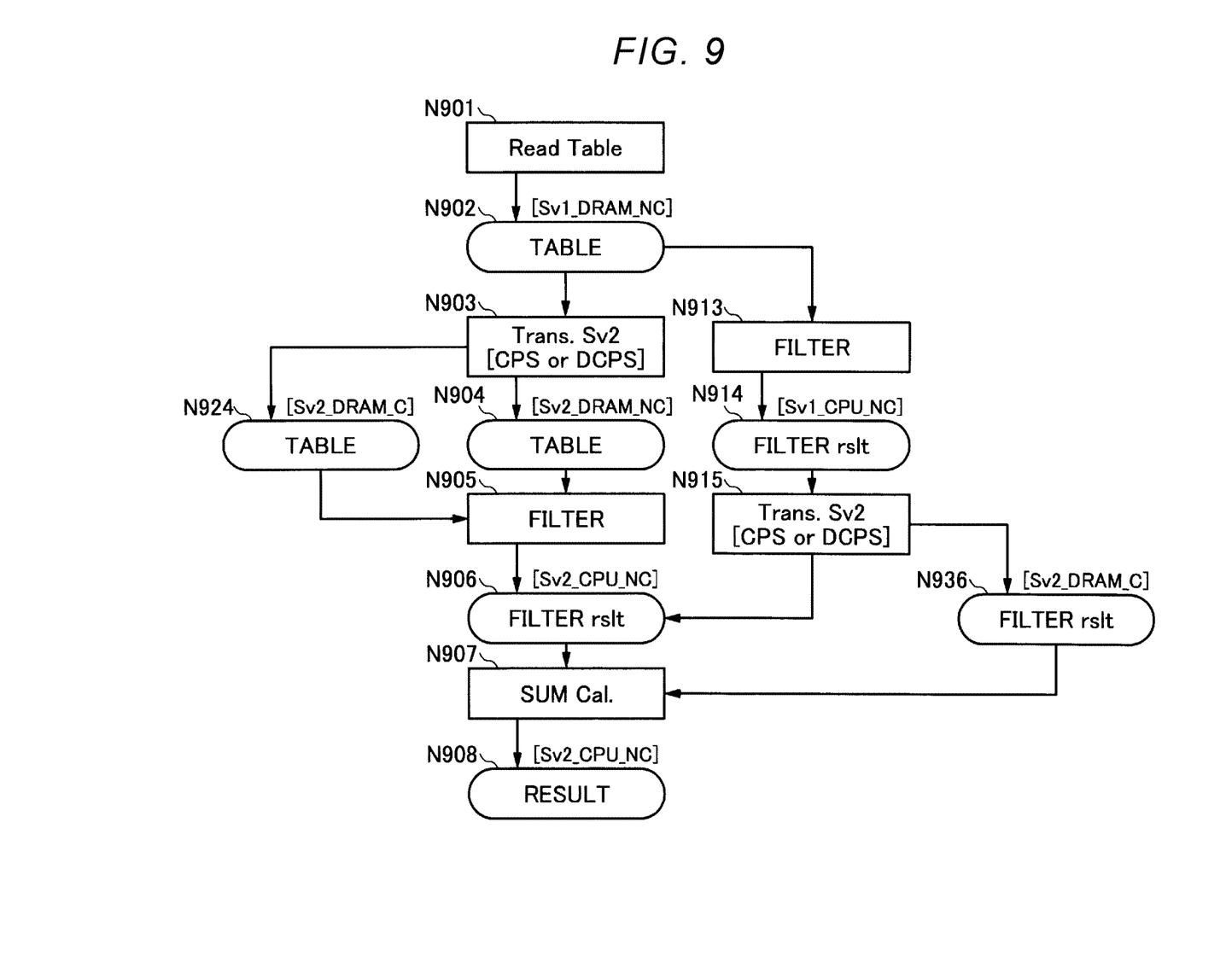
FIG. 9 is a diagram illustrating a task graph according to an embodiment.

FIG. 9 is a diagram showing a task graph according to the second embodiment. The task graph shown in FIG. 9 is similar to the task graph shown in FIG. 7, but N903 which is a combination of N703 and N723 of FIG. 7 is defined. In the same manner, in FIG. 9, N915 which is a combination of N715 and N735 of FIG. 7 is defined. Processing performed by the task graph shown in FIG. 9 is the same as processing performed by the task graph shown in FIG. 7, but description schemes of both the task graphs are different.

Both N903 and N915 are nodes which denote whether compressed data or uncompressed data is transferred when transferring data from the first server 100 to the second server 200. In the case of FIG. 9, by an edge branching from each of N903 and N915, it is possible to distinguish whether output data is compressed data or uncompressed data.

Specifically, the edge extending from N903 to N904 means that uncompressed data is transferred. Meanwhile, the edge extending from N903 to N924 means that compressed data is transferred. In the same manner, the edge extending from N915 to N906 means that uncompressed data is transferred. Meanwhile, the edge extending from N915 to N936 means that compressed data is transferred.

As described above, in the present embodiment, when a plurality of edges extend from one node, it is denoted whether compressed data or uncompressed data is transferred, depending on an edge which is passed through. In other words, in the task graph, a branch of a processing method may be denoted not by which node it passes through but by which edge it passes through.

3. Third Embodiment

A database system according to a third embodiment will be described with reference to FIG. 10. Since the configuration of the database system according to the third embodiment is similar to that of the database system according to the first embodiment, description of common features will be omitted. Hereinafter, differences from the database system according to the first embodiment will be mainly described.

3-1. Transformation of Task Graph Considering Compression State

Figure 10:
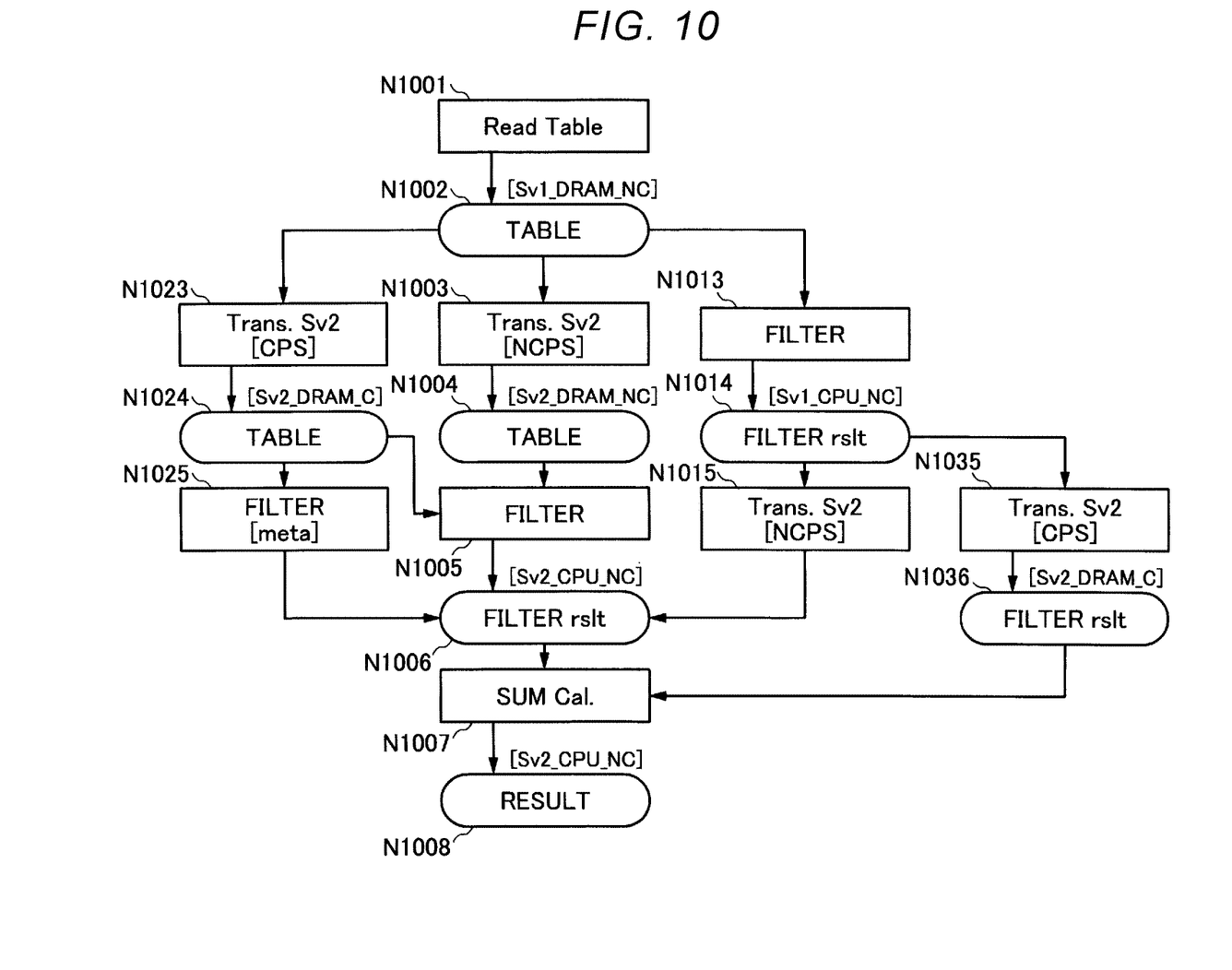
FIG. 10 is a diagram illustrating a task graph according to an embodiment.

FIG. 10 is a diagram showing a task graph according to the third embodiment. The task graph shown in FIG. 10 is similar to the task graph shown in FIG. 7. However, the task graph shown in FIG. 10 is different from the task graph shown in FIG. 7 in that, in FIG. 7, the edge extending from N724 is connected only to N705, whereas in FIG. 10, the edge extending from N1024 corresponding to N724 is connected to two nodes of N1005 and N1025.

As shown in FIG. 10, the edge extending from N1024 is connected not only to N1005 but also to N1025. When data stored in the DRAM 220 of the second server 200 is compressed data, based on additional information added to data input to N1025, the database system 10 determines at N1025 whether it is necessary to expand the compressed data. In N1025, as it is possible to determine whether it is necessary to expand data, filtering processing can be completed without expanding data.

For example, metadata including information on compression may be added to compressed data. More specifically, in the Parquet format which is a type used as a column-oriented database, data is divided into a unit called a row group of about several hundred MB, and then for each row group, "at least one of the maximum value and minimum value of the data included in the row group" is recorded as metadata.

Thus, for example, when executing filtering processing to "extract only data having a value of 100 or more", if the maximum value of data recorded in the metadata is 120, in order to execute the above filtering processing, it is necessary to expand compressed data. If the maximum value of data recorded in the metadata is 80, valid data is not included in a target row group. Therefore, in such a case, the database system 10 may determine that filtering processing is not necessary without expanding the data.

As described above, by determining, based on the additional information input to a node, whether to expand compressed data, more efficient processing can be achieved.

In the present embodiment, a configuration in which metadata includes at least one of the maximum value and the minimum value of data is illustrated, but metadata may include the sum of the data.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

Even if there are other working effects that are different from working effects brought about by the aspects of respective embodiments described above, the other working effects that are obvious from the description of the present specification or that can be easily anticipated by those skilled in the art are interpreted as being brought about by the present disclosure.

What is claimed is:

1. A method for executing query processing on a database, the method comprising:
   in response to a query from a host, generating a task graph indicating a plurality of task sequences, each of the task sequences capable of performing query processing corresponding to the query,
      wherein the plurality of task sequences includes a first sequence of tasks that outputs data in a first compression state to a one of output targets, and a second sequence of tasks that outputs the data in a second compression state different from the first compression state to the one of the output targets;
   determining a processing cost for each of the plurality of task sequences;
   selecting one of the plurality of task sequences in accordance with the determined processing cost; and
   performing the query processing corresponding to the query in accordance with the selected one of the task sequences.

2. The method according to claim 1, wherein the task graph includes a third sequence of tasks having tasks that are the same as those in one of the first or the second sequence but are arranged in different order from those in the one of the first or the second sequence.

3. The method according to claim 1, wherein said generating the task graph comprises:
generating a task graph in a first form including a plurality of task sequences having the same tasks arranged in different orders;
modifying the task graph in the first form to a task graph in a second form including a plurality of task sequences having the same task performed in different locations; and
modifying the task graph in the second form to a task graph in a third form including the first and second sequences.

4. The method according to claim 1, wherein said determining the processing cost comprises, with respect to each sequence of the plurality of task sequences:
determining a processing cost for each of tasks included in the sequence; and
determining a sum of processing costs of the tasks included in the sequence.

5. The method according to claim 4, wherein the first compression state is an uncompressed state, and the second compression state is a compressed state.

6. The method according to claim 5, wherein said determining the processing cost comprises:
with respect to the first sequence of tasks, determining a processing cost of the first sequence; and
with respect to the second sequence of tasks, determining a processing cost of the second sequence and a processing cost of decompressing data output through the second sequence.

7. The method according to claim 4, wherein the first compression state is a state of compression performed in accordance with a first compression method, and the second compression state is a state of compression performed in accordance with a second compression method different from the first compression method.

8. The method according to claim 7, wherein said determining the processing cost comprises:
with respect to the first sequence of tasks, determining a processing cost of the first sequence and a processing cost of decompressing data output through the first sequence; and
with respect to the second sequence of tasks, determining a processing cost of the second sequence and a processing cost of decompressing data output through the second sequence.

9. The method according to claim 7, wherein the first data compression method is a column-oriented data compression, and the second compression method is a byte-oriented data compression.

10. The method according to claim 1, wherein the processing cost of each of the task sequences is determined based on an amount of time for executing the sequence of tasks.

11. The method according to claim 1, wherein said selecting one of the plurality of task sequences comprises:
selecting one of the plurality of task sequences with the smallest processing cost.

12. The method according to claim 1, wherein
the database is implemented with a plurality of servers, the one of the output targets is a first one of the servers, the first sequence of tasks includes transfer of the data in the first compression state from a first one of the servers to a second one of the servers, and
the second sequence of tasks includes transfer of the data in the second compression state from the first server to the second server.

13. The method according to claim 12, wherein a processing speed of the second one of the servers is faster than that of the first one of the servers.

14. The method according to claim 1, wherein
the first sequence and the second sequence are denoted by the same node in the task graph,
the first compression state is denoted by a first edge connecting the node to a first node denoting a next task in the first sequence, and
the second compression state is denoted by a second edge connecting the node to a second node denoting a next task in the second sequence.

15. The method according to claim 1, wherein
the first compression state is a state of compression performed in accordance with a predetermined compression method,
the first sequence of tasks further includes, after the first sequence, a task of decompressing data output through the first sequence and a task of filtering the decompressed data, and
the plurality of task sequences further includes a fourth sequence of tasks that includes, after the first sequence, a task of filtering the data output through the first sequence without data decompression.

16. The method according to claim 15, wherein the task of filtering the data output through the first sequence without data decompression is performed using metadata included in the data in the first compression state output through the first sequence.

17. The method according to claim 15, wherein the metadata includes a maximum value and a minimum value of data included in the data in an uncompressed state.

18. A database system comprising:
a plurality of servers including a first server and a second server; and
a manager system configured to:
in response to a query from a host, generate a task graph indicating a plurality of task sequences, each of the task sequences capable of performing query processing corresponding to the query,
wherein the plurality of task sequences includes a first sequence of tasks that outputs data in a first compression state to a one of output targets, and a second sequence of tasks that outputs the data in a second compression state different from the first compression state to the one of the output targets;
determine a processing cost for each of the plurality of task sequences;
select one of the plurality of task sequences in accordance with the determined processing cost; and
perform the query processing corresponding to the query in accordance with the selected one of the task sequences.

19. The database system according to claim 18, wherein the task graph includes a third sequence of tasks having tasks that are the same as those in one of the first or the second sequence but are arranged in different order from those in the one of the first or the second sequence.

20. The database system according to claim 18, wherein the manager system is configured to, in generating the task graph:

generate a task graph in a first form including a plurality of task sequences having the same tasks arranged in different orders;

modify the task graph in the first form to a task graph in a second form including a plurality of task sequences having the same task performed by different servers; and modify the task graph in the second form to a task graph in a third form including the first and second sequences of tasks.

* * * * *